United States Patent [19]

Strohfeldt

[11] Patent Number: 5,893,599

[45] Date of Patent: Apr. 13, 1999

[54] NO-DRILL FASTENER FOR TRUCK UTILITY BOX

[75] Inventor: John D. Strohfeldt, Windsor, Wis.

[73] Assignee: Penda Corporation, Portage, Wis.

[21] Appl. No.: 08/920,922

[22] Filed: Aug. 29, 1997

[51] Int. Cl.[6] .................................................. B60R 9/00
[52] U.S. Cl. .................... 296/37.6; 224/404; 224/567; 224/545; 248/503
[58] Field of Search .................................. 296/37.6, 116; 410/106, 110; 248/682, 200, 503, 694; 224/402, 403, 404, 405, 545, 567

[56] References Cited

U.S. PATENT DOCUMENTS

| | | |
|---|---|---|
| 4,531,774 | 7/1985 | Whatley .............................. 296/37.6 |
| 4,728,017 | 3/1988 | Mullican . |
| 4,766,822 | 8/1988 | Gower . |
| 4,850,633 | 7/1989 | Emery . |
| 4,906,040 | 3/1990 | Edwards . |
| 4,944,544 | 7/1990 | Dick . |
| 4,946,215 | 8/1990 | Taylor . |
| 5,052,737 | 10/1991 | Farmer, Jr. . |
| 5,150,940 | 9/1992 | Kennedy . |
| 5,267,820 | 12/1993 | Sturtevant . |
| 5,308,133 | 5/1994 | Mangum et al. . |
| 5,345,658 | 9/1994 | Kennedy . |
| 5,443,341 | 8/1995 | Hamilton .............................. 410/116 |
| 5,513,934 | 5/1996 | German . |
| 5,551,742 | 9/1996 | Martindale et al. . |
| 5,588,631 | 12/1996 | Yee ...................................... 248/553 |
| 5,605,264 | 2/1997 | Neal ..................................... 296/37.6 |
| 5,628,598 | 5/1997 | Höfle . |
| 5,630,686 | 5/1997 | Billmann . |
| 5,640,749 | 6/1997 | Junkers . |
| 5,642,845 | 7/1997 | Van Kooten ................... 224/403 X |
| 5,779,117 | 7/1998 | Rogers et al. ........................ 224/403 |

Primary Examiner—D. Glenn Dayoan
Assistant Examiner—Jason Morrow
Attorney, Agent, or Firm—Lathrop & Clark LLP

[57] ABSTRACT

A utility box is mounted to a truck box without piercing the wall of the truck box. A J-bolt extends through a neoprene gasket, a washer and a back-up plate to clamp the back wall of the utility box to the front rail of a truck box. For mounting within a bedliner, the utility box is held against vertical displacement by stair stepped brackets which are bolted to the utility box to extend beneath the truck side rails. The upper faces of the stair steps are designed to interface with a variety of truck models of varying widths. When mounted in a truck box with an over-the-rail bedliner, a bolt is positioned inside the utility box and such that a shank passes through the wall of the utility box and the side wall of the liner. A spacer is positioned on the shank between the utility box wall and the wall of the liner. A collapsible nut mounted or the shank passes partway through the liner wall. Rotation of the bolt causes the portion of the collapsible nut which is located on the side of the liner wall facing away from the spacer to expand, thereby locking the side wall to the fastener.

5 Claims, 4 Drawing Sheets

NO-DRILL FASTENER FOR TRUCK UTILITY BOX

FIELD OF THE INVENTION

The present invention relates to fasteners for attaching accessories to cars and trucks in general, and in particular to fasteners which do not require permanent modification of the car or truck.

BACKGROUND OF THE INVENTION

As trucks, particularly pickup trucks, have grown in market share compared to other personal transportation vehicles, the number and type of accessories sold for use with trucks has increased. One widely used accessory used with pickup trucks is a plastic liner for the truck bed. The liner protects the bed of the truck box from dings and abrasion.

To increase the storage volume which is protected from rain and the elements on a pickup truck, toolboxes or cargo bed utility boxes are often used. Although a cargo bed utility box should meet basic functional requirements such as keeping the contents dry, organized and securely attached to the truck box, for many purchasers the appearance of the utility box is also important. For example, the appearance of a vehicle may contribute to a tradesman's reputation for neat, high quality, work.

Some pickup truck owners utilize the truck for personal transportation during the week, while using the truck's cargo transporting capability for a second job or hobby on nights or on weekends. This type of pickup truck owner is inclined to apply the appearance standards of cars to a pickup truck, further highlighting the importance of the appearance of any accessory used with a truck.

While some owners of pickup trucks who employ their trucks in their trade or business are willing to modify their trucks structurally to accommodate various storage racks and accessories, the typical consumer is reluctant to drill holes or otherwise modify their new pickup truck. There is a perception on the part of purchasers of new trucks that the immediate resale value and perhaps the long-term appearance of the vehicle might be diminished by permanent modifications to the truck even to the minimal extent of drilling holes for the mounting of attachment brackets.

Various fasteners have been developed for attaching truck bedliners to the bed of a truck without the need for modifying the truck structure. See, for example, U.S. Pat. No. 4,850,633 to Emery, and U.S. Pat. No. 4,906,040 to Edwards.

Since truck bedliners are relatively light, and have their weight distributed over the entire surface of the truck box, multiple fasteners may be used to attach the distributed weight of the bedliner to the truck box. A number of fasteners for attaching a cargo bed utility box to the bed of a truck which do not require drilling into the structure of the truck box have been developed. U.S. Pat. No. 5,052,737 to Farmer, Jr., discloses a clamping arrangement which allows a utility box which overlies the side rail of a truck to be clamped to the side walls of a truck box. A similar device, shown in U.S. Pat. No. 4,728,017 to Mullican, discloses a C-clamp like device which clamps to the front wall a truck box. A simple J-bolt can also be used to hook over the front rail of a truck box.

What is needed are additional types of brackets which can function as part of an attachment system for mounting a utility box to a truck box with or without a bedliner.

SUMMARY OF THE INVENTION

The present invention provides a system of fasteners or brackets for mounting a utility box in a pickup truck with or without a truck bedliner. A conventional J-bolt with a neoprene gasket, a washer and a back-up plate, is used to clamp the back wall of a utility box to the front rail of a truck box. If the truck box in which the utility box is mounted does not have a bedliner, the utility box is held down to the floor of the truck box by positioning stair step brackets under the side rails of the truck box. Two stair step brackets are attached to the side walls of the utility box by bolts which pass through a planar bracket wall and a side wall of the utility box. The planar bracket wall is joined with an upwardly facing stair step upper surface by gusset plates which form a rigid bracket. The upper faces of the stair steps are designed to interface with a variety of truck models of varying widths. The function of the stair step brackets is to prevent the utility box from being moved up and down as the truck moves over the road.

If the utility box is placed in a truck box which is lined with a bedliner of the over-the-rail type, the undersides of the rail are not available for engagement by a stair step bracket. A fastener comprised of a bolt, a spacer, and a collapsible nut is then employed. The bolt has a head which is positioned inside the utility box and a shank which passes through the wall of the utility box and the side wall of the liner. A spacer is positioned on the shank between the utility box wall and the wall of the liner. A collapsible nut mounted on the shank passes partway through the liner wall. Rotation of the bolt causes the portion of the collapsible nut which is located of the side of the liner wall facing away from the spacer to expand, thereby locking the side wall to the fastener.

It is an object of the present invention to provide a system of fasteners and brackets for attaching a utility box to a truck box without the need to modify the structure of the truck box.

It is a further object of the present invention to provide a bracket which prevents vertical movement of a truck utility box when positioned in a truck bed.

It is a still further object of the present invention to provide a system of fasteners which has features preventing water from gaining entrance to the interior of the truck box.

It is a yet further object of the present invention to provide a fastener for connecting a utility box to a truck bedliner.

Further objects, features and advantages of the invention will be apparent from the following detailed description when taken in conjunction with the accompanying drawings.

DESCRIPTION OF THE PREFERRED EMBODIMENTS

Figure 1:
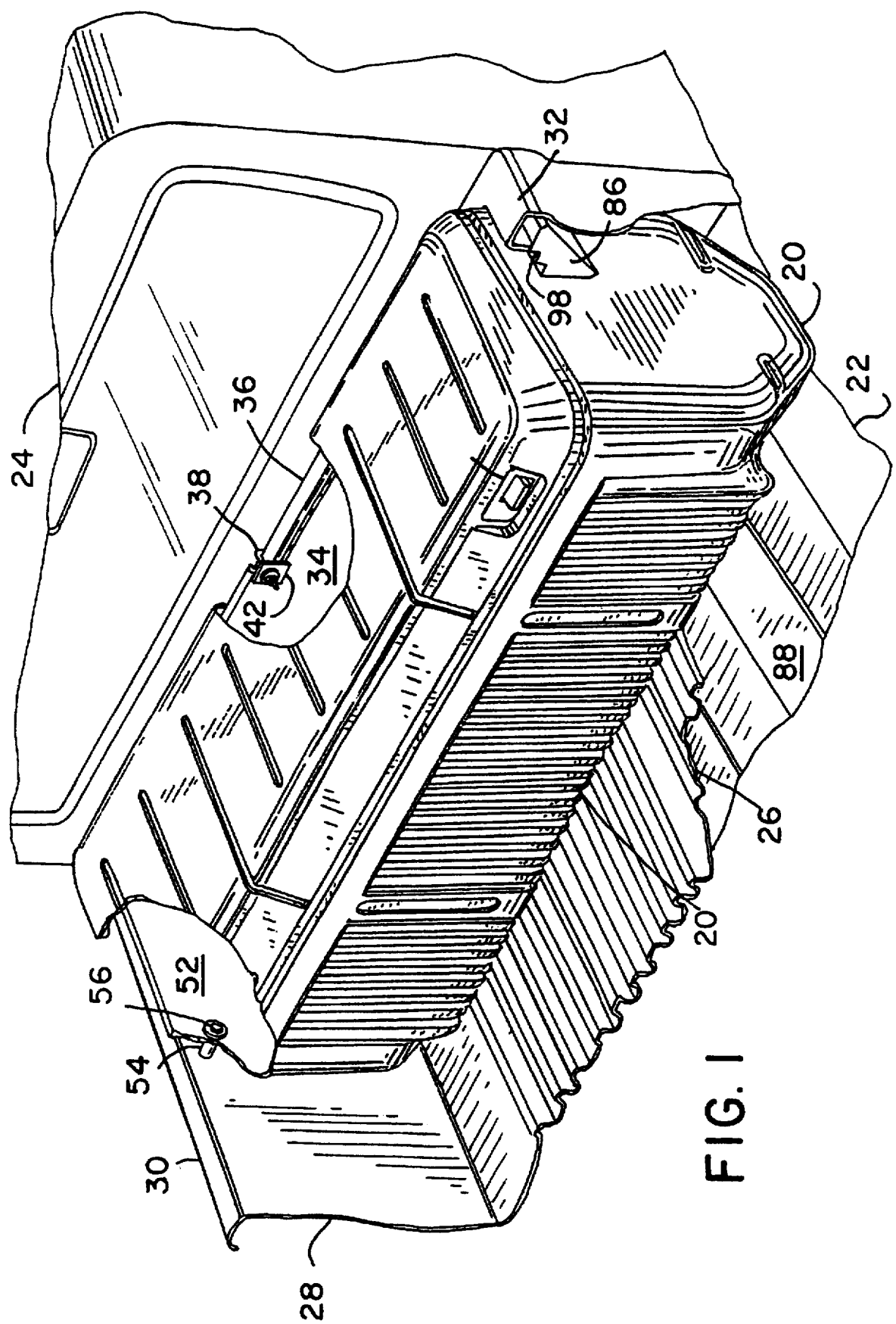
FIG. 1 is a fragmentary isometric view of a truck box with a bedliner and truck utility box connected therein by the attachment brackets of the present invention.

Referring more particularly to FIGS. 1–7, wherein like members refer to similar parts, a utility box 20 is shown in FIG. 1 mounted in a truck box 22 of a pickup truck 24. The utility box 20 is shown resting on a thermoplastic bedliner 26. The bedliner 26 has an upwardly extending side wall 28 and an over-the-rail cap 30. For simplicity of illustration, the utility box is shown mounted into the side wall 28 of the liner 26 on one side and directly to the side rail 32 of the truck box 22 on the other side.

Figure 2:
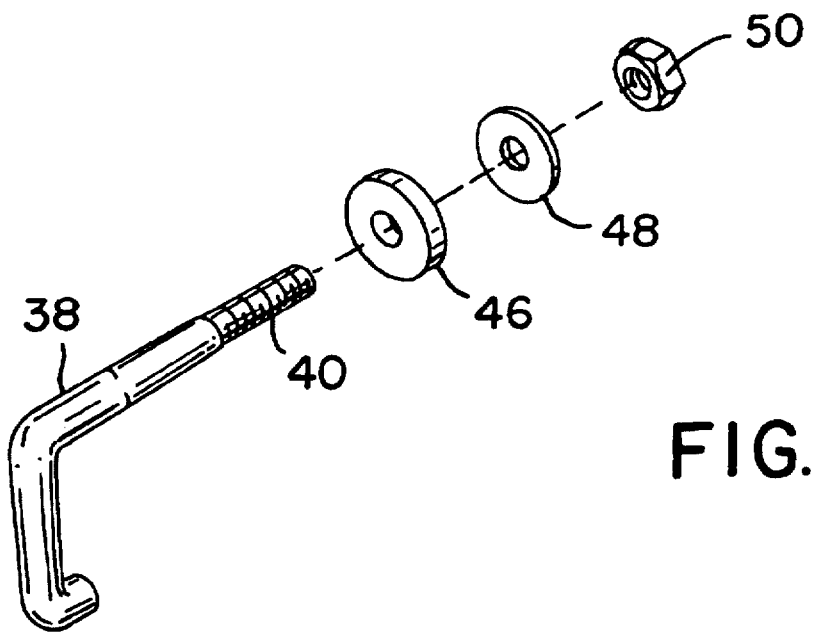
FIG. 2 is an exploded isometric of a J-bolt employing a neoprene gasket.
Figure 3:
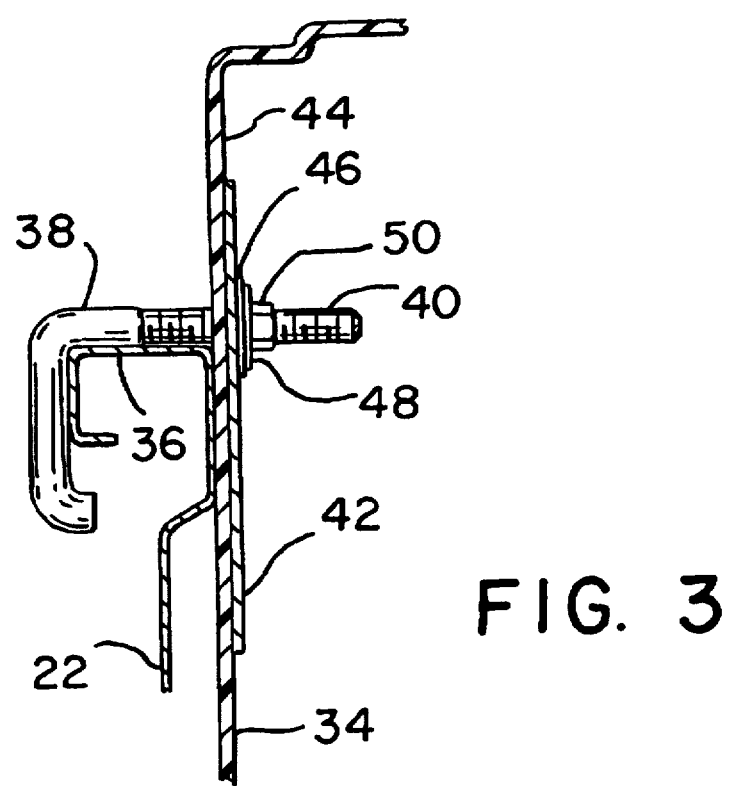
FIG. 3 is a cross-sectional view of the J-bolt of FIG. 2 holding a utility box engaged with the front rail of a truck box.
Figure 4:
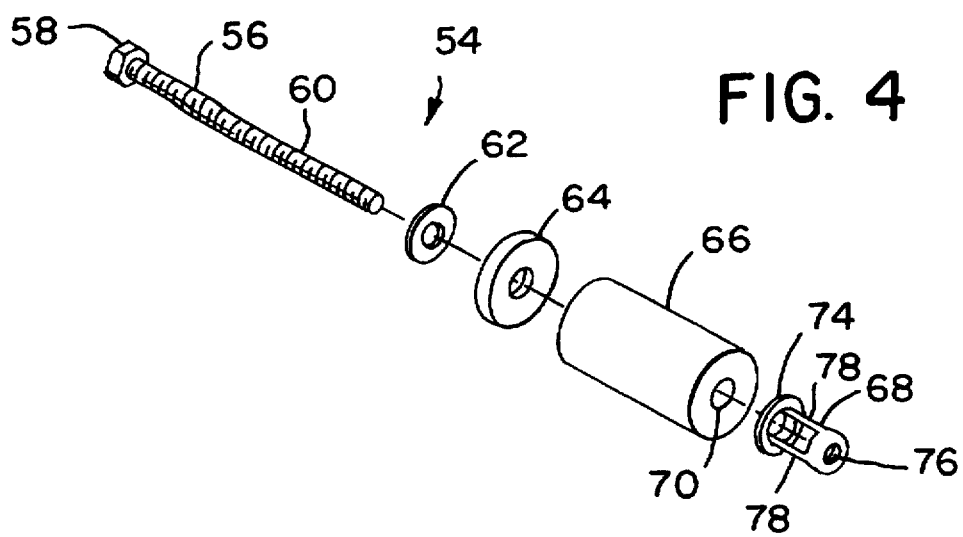
FIG. 4 is an exploded isometric view of a fastener for attaching a utility box to the side wall of a bedliner.
Figure 5:
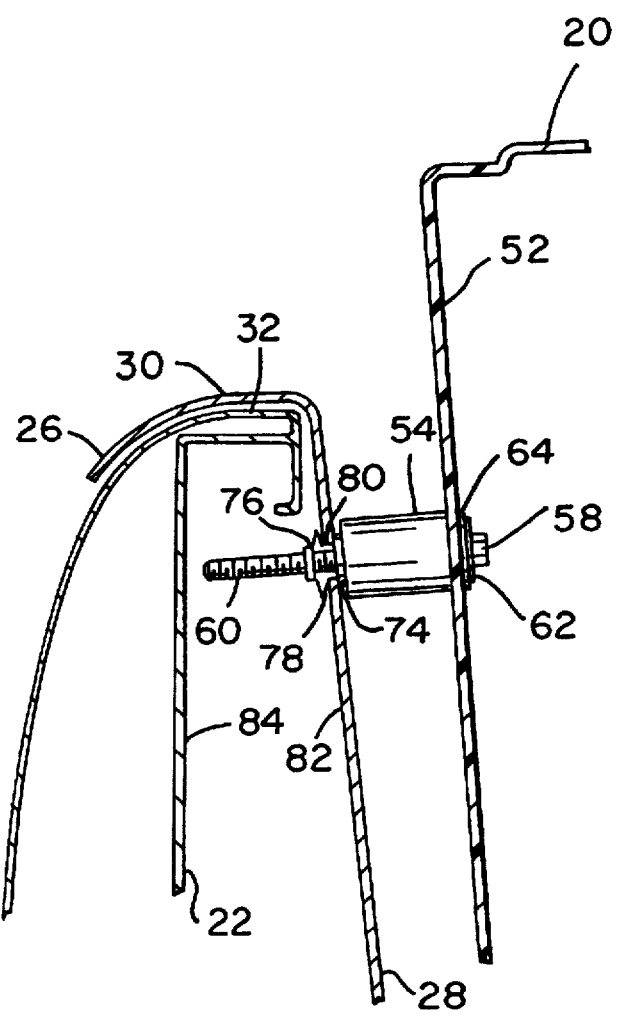
FIG. 5 is a cross-sectional view of the fastener of FIG. 4 holding a utility box engaged with the side wall of a bedliner.

The back wall 34 of the utility box 20 is connected to the front rail 36 of the truck box 22 by a J-bolt 38, as shown in FIGS. 2 and 3. The J-bolt 38 has a threaded portion 40 which extends through a backup plate 42 positioned on the inside wall 44 on the utility box 20. The J-bolt 38 threaded portion extends through the utility box back wall 34 and over the truck box front rail 36. A neoprene gasket 46, a washer 48, and a nut 50 are positioned on the inside of the utility box 20. Tightening the nut 50 clamps the utility box 20 against the front rail 36 and at the same time compresses the neoprene gasket 46, preventing water from entering the utility box 20 through the hole through which the J-bolt 38 passes. The presence of the bedliner 26 will not interfere with the placement and clamping action of the J-bolt 38.

The method of attaching the side walls 52 of the utility box 20 depends on whether a bedliner is used or not. Where a bedliner is used, a fastener 54, best shown in FIGS. 4 and 5 may be used. The fastener 54 consists of a bolt 56 which has a head 58 from which a threaded shank 60 extends, a washer 62, a neoprene gasket 64, a plastic spacer 66, and a collapsible nut 68. The plastic spacer 66 has a central hole 70 through which the shank 60 of the bolt 56 extends. The plastic spacer 66 is positioned between the side wall 52 of the utility box 20 and the side wall 28 of the bedliner 26.

The collapsible nut 68 consists of an un-threaded washer 74 which is connected to a threaded portion 76 by two collapsible struts 78. The threaded portion 76 is threadedly engaged with the threaded shank 60 of the bolt 56. The collapsible nut 68 is positioned within a hole 80 in the side wall 28 of the bedliner 26. The un-threaded washer 74 is mounted on the side 82 of the side wall 28 facing the utility box 20. The collapsible struts 78 extend through the hole 80 and position the threaded portion 76 on the side 82 of the side wall 28 facing the truck box wall 84. The washer 62 and neoprene gasket 64 are positioned on the inside of the utility box 20 so that the neoprene gasket 64 is compressed when the bolt 56 is tightened.

Tightening the bolt 56 causes the threaded portion 76 of the collapsible nut to move towards the un-threaded washer 74, thereby collapsing the struts 78 against the side wall 28 of the truck bedliner 26. Thus the fastener 54 attaches the utility box 20 to the side walls 28 of the bedliner 26.

Any system for attachment of some structure or other aftermarket item to the bed of a pickup truck must accommodate a range of different truck models and brands. The fastener 54 can readily be adjusted to various models by varying the size of the plastic spacers 66 and, if necessary, the bolt 56.

Figure 6:
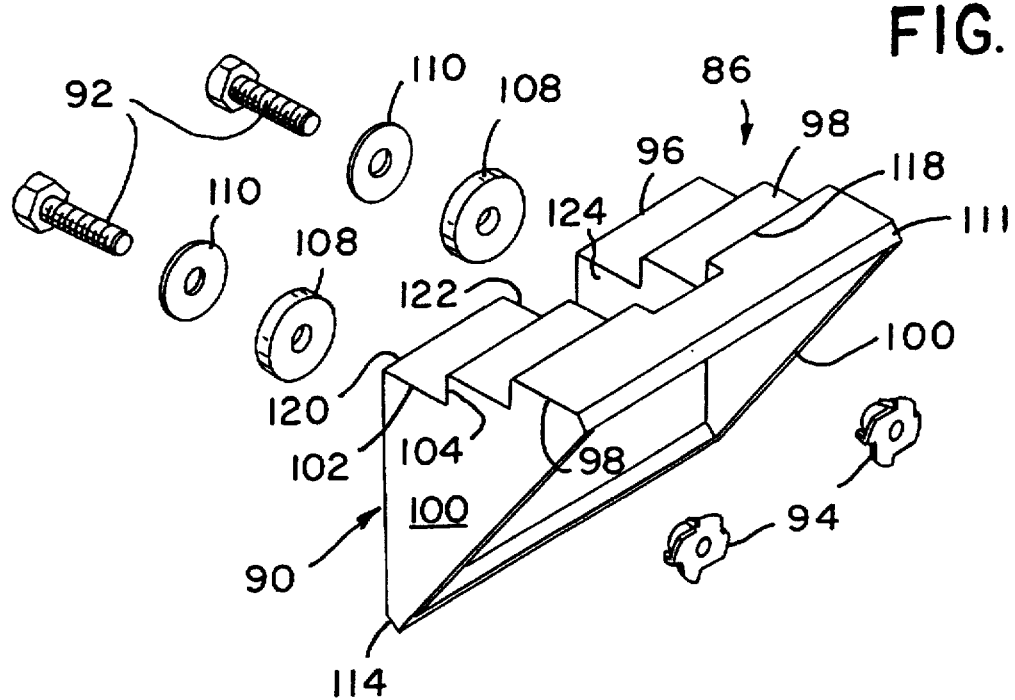
FIG. 6 is an exploded isometric view of a bracket for holding a utility box against the underside of the side rail of a truck box.
Figure 7:
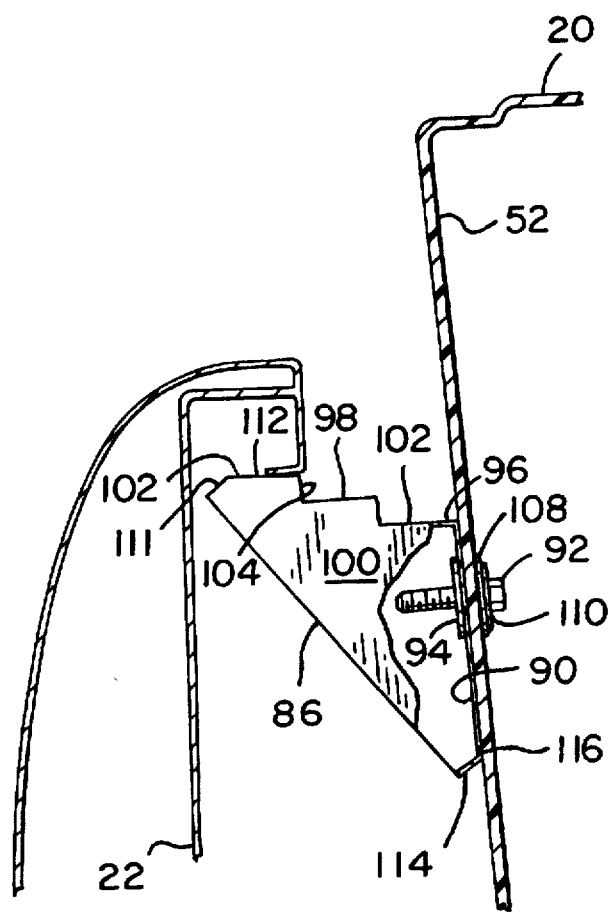
FIG. 7 is a cross-sectional view of the bracket of FIG. 6 holding a utility box under the side rail of a truck box.

If a bedliner is not used in the truck box 22, the bracket 86, shown in FIGS. 1, 6 and 7, can be used to prevent the utility box 20 from tilting or rising out of the bed 88 of the truck box 22. The bracket 86 has a planar wall 90 which is rigidly mounted to the side wall 52 of the utility box 22 by two bolts 92 and locking nuts 94. Extending from the top 96 of the planar wall 90 is a stair stepped upper surface 98. The stair stepped upper surface 98 is connected to the planar wall 90 by outside gussets 100. The treads 102 of the stair stepped upper surface 98 are joined by short riser surfaces 104. Either the treads 102 or the riser surfaces 104 can be used to engage truck box side rails 32. The multiple stair steps formed by the riser surfaces 104 and treads 102 can accommodate a number of different models and designs of pickup truck boxes. Moisture is prevented from penetrating the structural wall 52 of the utility box 20 by neoprene gaskets 108 which are compressed against the inside of the structural wall 52 by the washers 110.

The bracket 86 will typically be formed of plastic either by thermoforming or preferably by injection molding. To increase the stiffness of the structure of the bracket 86 a small gusset 111 is formed on the uppermost step 112. Similarly, a small gusset 114 is formed on a lowermost portion 116 of the planar wall 90.

In order to lend greater strength to the stair stepped upper surface 98, the surface is divided into two sections 118 and 120 which are separated by a groove 122 which allows additional gusset surfaces 124 to structurally connect the two sections 118 and 120 to the planar wall 90.

A typical system of bracket connectors will employ two or more J-bolts for joining the wall of the utility box to the front rail 36 of the truck box 22, and at least one fastener 54 on each side of the utility box 20 if it is positioned on top of a truck bedliner 26. If no truck bedliner is used, at least two brackets 86 should be used to engage the side walls 52 of the utility box with the underside of the side rail 32.

It is understood that the invention is not limited to the particular construction and arrangement of parts herein illustrated and described, but embraces such modified forms thereof as come within the scope of the following claims.

I claim:

1. A restraining bracket for restraining a structure within the bed of a truck box comprising:

a truck box rail mounted on a side wall of a truck box;

a structure having a wall spaced from the side wall of the truck box;

a bracket fixedly mounted to the structure wall, the bracket having a planar wall which engages the structure wall to provide rigid mounting of the bracket to the structure, the bracket having a stair stepped uppermost surface extending from an uppermost portion of the bracket planar wall; and gusset plates rigidly connecting the stair stepped upper surface with the bracket planar wall, wherein the stair stepped uppermost surface extends beneath the truck box rail.

2. The bracket of claim 1 wherein the stair stepped uppermost surface has three steps.

3. The bracket of claim 1 wherein the bracket is fixedly mounted to the structure wall by a bolt which passes through the the structure wall and the planar wall of the bracket.

4. The bracket of claim 3 further comprising compressible gaskets positioned along the bolts to prevent the passage of water through the wall spaced from the side wall of the truck box.

5. The bracket of claim 1 further comprising two inner gussets parallel to the gusset plates and forming a channel in the uppermost stair stepped surface.

* * * * *